United States Patent
Plowman

(10) Patent No.: US 10,192,141 B2
(45) Date of Patent: Jan. 29, 2019

(54) DETERMINING SCALE OF THREE DIMENSIONAL INFORMATION

(71) Applicant: Application Solutions (Electronics and Vision) LTD, Lewes (GB)

(72) Inventor: Robin Plowman, Southwick (GB)

(73) Assignee: APPLICATION SOLUTIONS (ELECTRONICS AND VISION) LTD., Sussex (GB)

( * ) Notice: Subject to any disclaimer, the term of this patent is extended or adjusted under 35 U.S.C. 154(b) by 0 days.

(21) Appl. No.: 15/359,203

(22) Filed: Nov. 22, 2016

(65) Prior Publication Data

US 2017/0076459 A1 Mar. 16, 2017

Related U.S. Application Data

(63) Continuation of application No. PCT/EP2014/060975, filed on May 27, 2014.

(51) Int. Cl.
*G06K 9/00* (2006.01)
*G06K 9/62* (2006.01)
(Continued)

(52) U.S. Cl.
CPC ......... *G06K 9/6202* (2013.01); *G06K 9/4604* (2013.01); *G06T 7/579* (2017.01);
(Continued)

(58) Field of Classification Search
CPC ............... G06K 9/6202; G06K 9/4604; G06K 9/00268; G06K 9/00288; G06K 9/6112;
(Continued)

(56) References Cited

U.S. PATENT DOCUMENTS 9,734,414 B2 * 8/2017 Samarasekera .... G06K 9/00791
2008/0167814 A1 * 7/2008 Samarasekera ...... G01C 21/005
701/469
(Continued)

FOREIGN PATENT DOCUMENTS

JP 2007263669 A 10/2007
JP 2009186353 A 8/2009
(Continued)

OTHER PUBLICATIONS

Kitt et al:"Monocular Visual Odometry using a Planar Road Model to Solve Scale Ambiguity" Sep. 2011.*
(Continued)

*Primary Examiner* — Ali Bayat

(57) ABSTRACT

This disclosure relates to a method in which points common to two or more of the images that appear to represent the same real world features are identified, and changes in the location of the points between respective images are used to deduce the motion of the camera and to find the position of the real world features in three dimensional space. In order to determine the scale of the three dimensional information, the position of a reference feature, whose actual distance from the camera is known, is found from the images. The reference feature is found by considering only candidate points selected from candidate points falling within a portion of the image corresponding to a part of the field of view of the camera. The scale is determined from the distance between the camera and the reference feature in the image and in real life.

15 Claims, 7 Drawing Sheets

(51) Int. Cl.
*G06T 7/579* (2017.01)
*G06K 9/46* (2006.01)

(52) U.S. Cl.
CPC ............... *G06T 2207/10016* (2013.01); *G06T 2207/10028* (2013.01); *G06T 2207/30252* (2013.01)

(58) Field of Classification Search
CPC .. G06T 7/579; G06T 7/10016; G06T 7/10028
See application file for complete search history.

(56) References Cited

U.S. PATENT DOCUMENTS

2009/0243889 A1* 10/2009 Suhr ................. G06K 9/00812
340/932.2
2014/0078258 A1* 3/2014 Chandraker ....... H04N 13/0203
348/46

FOREIGN PATENT DOCUMENTS

| JP | 2006349607 | | 10/2009 |
| JP | 2011112507 | A | 6/2011 |
| JP | H07077421 | A | 6/2011 |

OTHER PUBLICATIONS

Japanese Office Action dated Nov. 22, 2017 for corresponding Japanese application 2016-567066.

\* cited by examiner

DETERMINING SCALE OF THREE DIMENSIONAL INFORMATION

CROSS REFERENCE TO RELATED APPLICATION

This U.S. patent application is a continuation application and claims the benefit of PCT patent application no. PCT/EP2014/060975, filed May 27, 2014, designating the United States, the content which is hereby incorporated by reference herein in its entirety.

TECHNICAL FIELD

This disclosure relates to a method of generating scale information, and in particular to a method of generating scale information from images captured by a camera mounted on a vehicle, and to a corresponding apparatus.

BACKGROUND

Various techniques are available for obtaining three-dimensional (3D) information from two-dimensional (2D) images captured sequentially by a single camera as it moves. One such technique is described in the paper "Shape and motion from image streams under orthography—a factorization method", by C. Tomasi and T. Kanade, Technical Report TR-92-1270, Cornell University, March 1992. This technique basically involves identifying points in the captured images that appear to represent the same real world features. Changes in the location of the points between respective images can then be used to deduce the motion of the camera and to triangulate the position of the real world features in 3D space. Although computationally expensive, the techniques generally work well. However, one limitation is that it is impossible to know the scale of the 3D structure that is generated without knowledge of the size of at least one real world feature for comparison purposes.

This sort of technique has been applied in the field of vehicle camera systems to obtain information about a vehicle's surroundings. For example, in U.S. patent publication 2009/0243889, a free parking space detection system is described, in which a 3D structure generated from images captured by a single camera mounted on a vehicle is used to estimate positions of adjacent vehicles. In U.S. publication 2009/0243889, the scale of the generated 3D structure is determined by detecting a ground plane in the 3D structure, estimating the height of the camera above the ground plane within the 3D structure, and comparing this height with the height of the camera in the real world, which is assumed to be fixed, to calculate a "camera height ratio" between the generated 3D structure and the real world. The camera height ratio represents the scale of the 3D structure.

The ground plane is identified by first ensuring that the 3D structure is properly oriented in an XYZ coordinate system, with Y representing the vertical. The ground plane is then estimated to be at the location along the Y axis having the highest density of identified real world features. A RANdom SAmple Consensus (RANSAC) method is then applied to refine the location of the ground plane. The RANSAC method iteratively selects a subset of the identified real world features near the estimated ground plane for inclusion in determination of a refined ground plane, with features in the selected subset generally being known as inliers and features not in the selected subset being known as outliers.

One problem with the technique described in U.S. publication 2009/0243889, is that the surface on which a vehicle stands, e.g. the surface of a road, is generally fairly uniform and featureless. It is also likely that other horizontal surfaces may be present in the images at different heights to the surface on which the vehicle stands, such as a pavement or the bodywork of another vehicle. This means that the assumption that the ground plane is located along the Y axis where the density of identified features is at a maximum may often be wrong, and other surfaces may be falsely identified as the surface on which the vehicle is standing. If the ground plane is identified incorrectly, the calculated camera height ratio will be incorrect and the scale of the generated 3D structure inaccurate. In the free parking space section method described in U.S. publication 2009/0243889, this may lead to distances to other objects within the generated 3D structure being wrong, with the result that parking spaces may be misidentified and, in the absence of other safeguards, vehicle collisions may occur.

SUMMARY

Example embodiments seek to address and overcome the above-identified difficulties. According to a first aspect, there is provided a method including: receiving a sequence of images from a camera; identifying candidate points representing features common to two or more of the images; deriving three dimensional information from the images based on changes in position of candidate points between the images; identifying candidate points associated with a reference feature in the images; and determining a scale of the three dimensional information based on a distance between the camera and the reference feature, wherein identifying candidate points associated with the reference feature includes selecting only from candidate points falling within a portion of the image corresponding to a part of the field of view of the camera.

According to a second aspect, there is provided an apparatus including: an image stage, arranged to receive, in use, a sequence of images from a camera; and operable to identify candidate points representing features common to two or more of the images; and to derive three dimensional information from the images based on changes in position of candidate points between the images; and an information extraction stage, coupled to the image stage and arranged to identify candidate points associated with a reference feature in the images by selecting only from candidate points falling within a portion of the image corresponding to a part of the field of view of the camera; and to determine a scale of the three dimensional information based on a distance between the camera and the reference feature.

Embodiments of the invention therefore enable errors caused by the mis-identification of a ground plane to be reduced, minimized or eliminated, leading to the more accurate determination of the scale of three dimensional information.

In some embodiments, the expected position of the reference feature within the field of view of the camera is determined and the portion of the image, from within which candidate points are selected, and that includes the expected position of the reference feature is identified. In these embodiments the likelihood of finding the reference feature is increased by only considering candidate points in an area where the reference feature is likely to be.

In some embodiments, the scale of three dimensional information can be determined simultaneously from respective image sequences captured simultaneously from more than one camera. The determined scales and/or corresponding scaled three dimensional data can be compared to indicate the reliability of the determined scale factors.

In some embodiments, the scale of three dimensional data is determined from a sequence of images from a camera mounted on the vehicle and arranged to capture images of at least the ground over which the vehicle has passed. In such embodiments, the accuracy of the determination of the scale factor may be improved because it is likely to be easier to identify the ground plane for the ground over which the vehicle has already passed, which can be assumed to be flat and to have an easily identifiable ground plane.

BRIEF DESCRIPTION OF THE DRAWINGS

Embodiments of the disclosure are described below, with reference to the accompanying drawings, by way of example only.

DETAILED DESCRIPTION

The following description of the example embodiment(s) is merely exemplary in nature and is in no way intended to limit the invention, its application, or uses.

One method of generating scale information from images captured by a camera will now be described in the context of a vehicle camera system.

Figure 1:
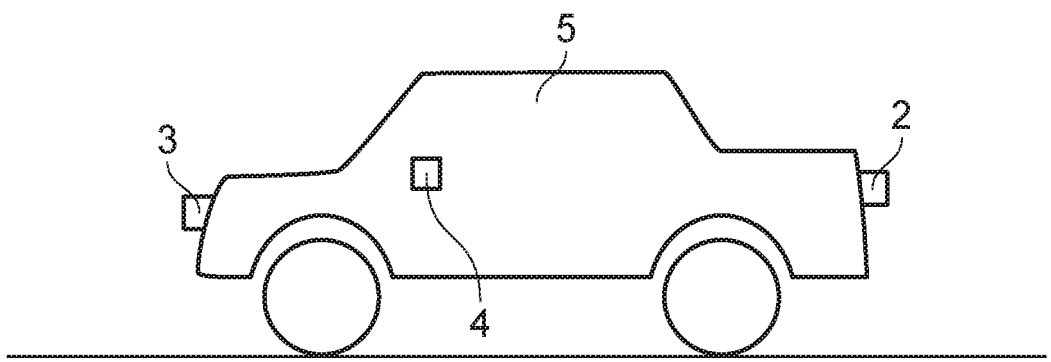
FIG. 1 is a schematic illustration of a vehicle camera system in a vehicle, according to an embodiment of the present disclosure.
Figure 2:
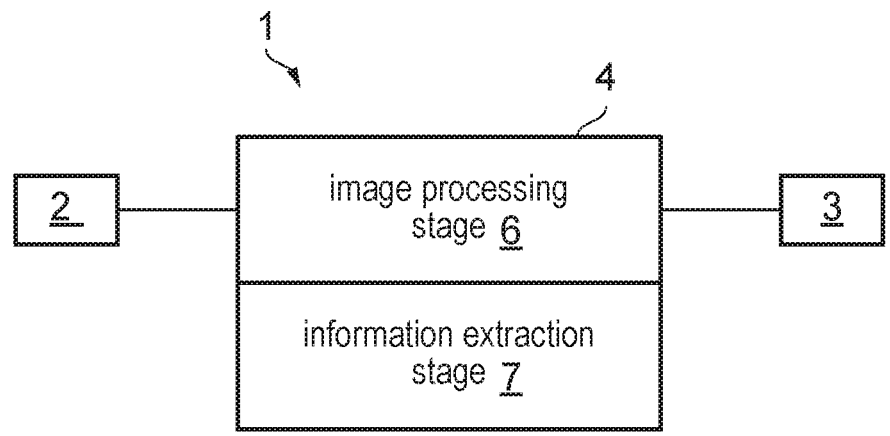
FIG. 2 is a schematic illustration of a vehicle camera system according to the embodiment shown in FIG. 1.

Referring to FIGS. 1 and 2, a vehicle camera system 1 according to one embodiment comprises a rear view camera 2, a front view camera 3 and a processing unit 4 mounted on a vehicle 5. The rear view camera 2 is mounted at a rear end of the vehicle 5 so that the field of view of the rear view camera 2 includes the surroundings behind the vehicle 5. The front view camera 3 is mounted at a front end of the vehicle 5 so that the field of view of the front view camera 3 includes the surroundings ahead of the vehicle 5. The processing unit 4 is coupled to the rear view camera 2 and the front view camera 3 so as to receive images captured by the cameras 2, 3.

In the illustrated embodiment, the processing unit 4 has an image processing stage 6 and an information extraction stage 7. The image processing stage 6 is arranged to receive a sequence of images from a camera and to identify candidate points in the image representing features common to two or more of the images, as will be explained in more detail in the following description. The information extraction stage 7 is arranged to use the candidate points identified by the image processing stage 6 to determine three dimensional information relating to the objects being imaged by the camera, as well as information relating to the scale of the three dimensional information, as will be explained in more detail in the following description.

The operation of the processing unit 4 of the vehicle camera system 1 of the illustrated embodiment will be explained in more detail with reference to FIG. 3.

At step S1, the image processing stage 6 is arranged to receive a respective sequence of images captured by at least one of the rear view camera 2 and the front view camera 3. The processing of only one of the sequence of images will be described hereafter, for the sake of clarity.

In some embodiments, the rear view camera 2 and/or the front view camera 3 may have an optical lens with a wide field of view, such as a wide angle lens or fish-eye lens. These optical lenses can capture images over a solid angle extending over as much as an entire hemisphere, or $2\pi$ steradians, but a drawback of this is that features at the edge of the captured images tend to be either stretched or squashed in comparison to features at the centre of the captured images due to optical distortion. In this case, the image processing stage 6 uses information about the optical distortion caused by the lens to correct the captured images and produce corrected images in which the relative dimensions of features present in the images depend more directly on their distance from the respective camera 2, 3, and not so much on the nature of the lenses.

At step S2, the image processing stage 6 identifies candidate points representing features that are common to two or more of the images in the image sequence. A candidate point is a pixel in an image that has particular characteristics, or more commonly a group of pixels of an image that have particular characteristics. In this embodiment, a candidate point is identified as one or more pixels having a variation in brightness or colour with respect to surrounding pixels greater than respective threshold values. Typically these candidate points in the images will represent real world features in the scene being imaged, such as, for example, an edge of a building or a line on a road.

At step S3, the information extraction stage 7 uses the identified candidate points to derive three dimensional information from the sequence of images based on changes in candidate points between the images. Specific techniques useful to generate three-dimensional (3D) structures from a sequence of images will be known to a skilled person, and will be described further with reference to FIGS. 9 and 10, and so will not be described in more detail here.

At step S4, the information extraction stage 7 identifies candidate points associated with a reference feature in the image by selecting only from candidate points falling within a portion of the image corresponding to a part of the field of view of the camera.

An object that is suitable to use as a reference feature is one that can be identified from the sequence of images, and that has a known spatial separation from the camera that produced the image sequence. The reference feature may be a ground plane, i.e. a flat surface at ground level, if the height of the camera from the ground is known. For example, if the camera is mounted on a vehicle, the reference feature may be the surface on which the vehicle stands, which will generally be a road. In other embodiments the reference feature may be any fixed point relative to the camera, either a dedicated reference point object may be provided or for example a part of the vehicle may be used if the camera is mounted on a vehicle.

In embodiments of the invention, the expected position of the reference feature within the field of view of the camera is determined, and only candidate points lying in the portion of the image corresponding to the expected position of the reference feature are selected.

Figure 4:
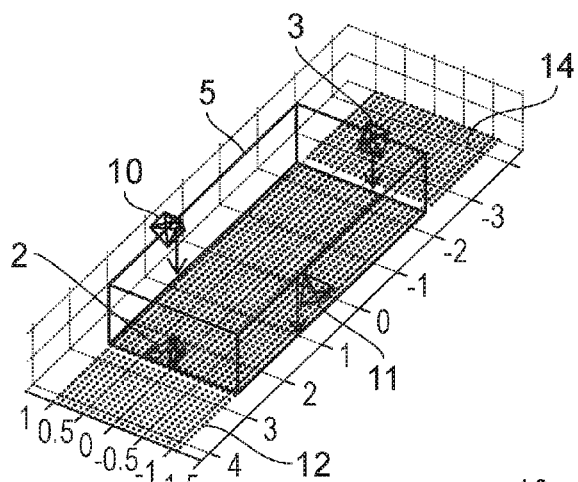
FIG. 4 is a schematic illustration showing areas in which a ground plane can be expected.

FIG. 4 shows the vehicle 5 having the rear view camera 2 and the front view camera 3. In addition, vehicle 5 shown in FIG. 4 is also provided with side view cameras 10, 11. The positions of each of the cameras relative to the vehicle and the mounting height of each of the cameras are known, as indicated by the double headed arrows in FIG. 4.

Figure 5:
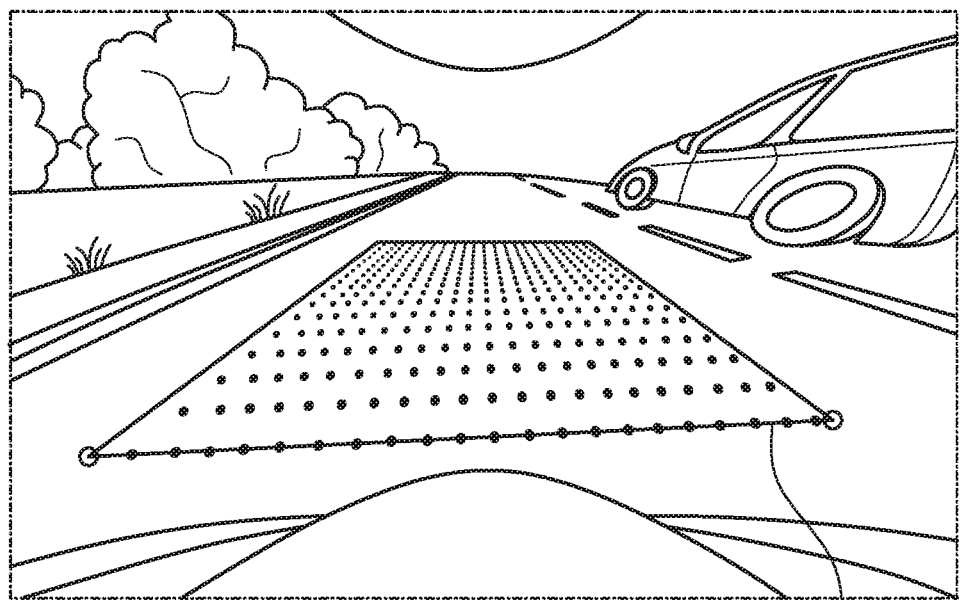
FIG. 5 is an image showing a portion of an image corresponding to a part of the field of view of a camera.
Figure 6:
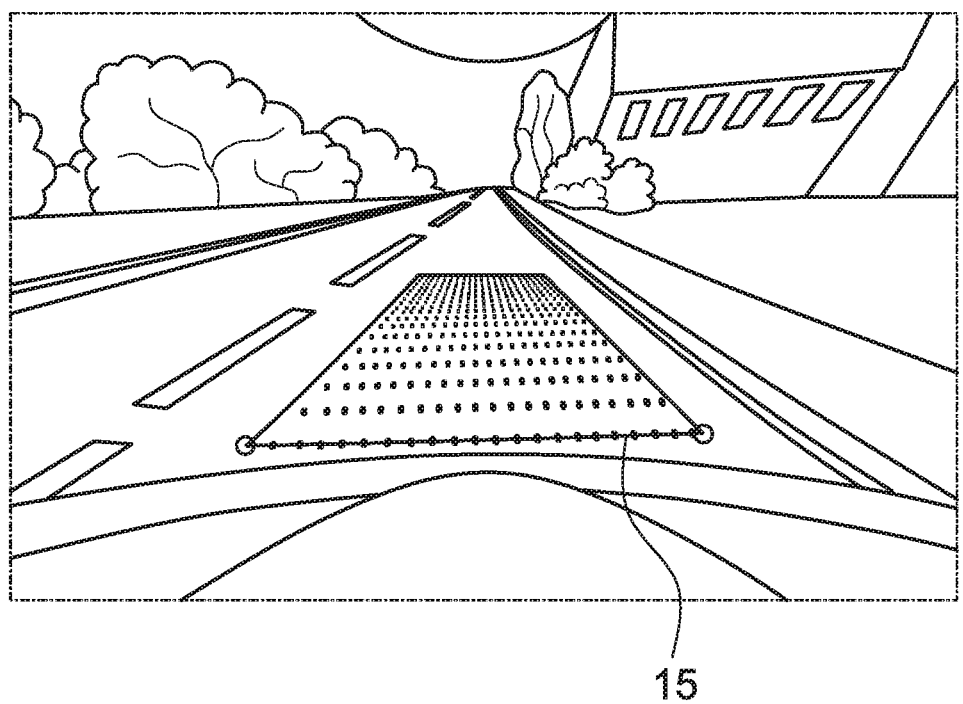
FIG. 6 is an image showing a portion of another image corresponding to a part of the field of view of the camera.

To the rear of the rear view camera 2, an area 12 can be identified where a ground plane can be expected. The area 12 can be projected onto the image captured by the rear facing camera 2, as illustrated by the boxed area 13 shown in FIG. 5. The co-ordinates of the portion of the image corresponding to a part of the field of view of the rear view camera 2 represented by boxed area 13 can be saved and used to select the subset of candidate points from which to identify candidate points associated with the reference feature.

Similarly, in front of the forward facing camera 3, an area 14 can be identified where a ground plane can be expected. The area 14 can be projected onto the image captured by the forward facing camera 3, as illustrated by the boxed area 15 shown in FIG. 5. The co-ordinates of the portion of the image corresponding to a part of the field of view of the front view camera 3 represented by boxed area 15 can be saved and used to select the subset of candidate points from which to identify candidate points associated with the reference feature.

In embodiments of the invention, the position of areas 12 or 14 in which the reference feature, in this case a ground plane, can be expected is determined using information relating to the specific camera. So, for example, in the illustrated embodiment the position of area 12 or 14 may be affected by factors such as the height or orientation or position of the camera mounted on the vehicle.

In embodiments, the candidate points that lie within the boxed areas 13, 15 are analysed to fit a ground plane to their locations in the three dimensional structure. Again, this step will be described in more detail in connection with an embodiment of the invention described with reference to FIGS. 9 and 10.

Figure 7:
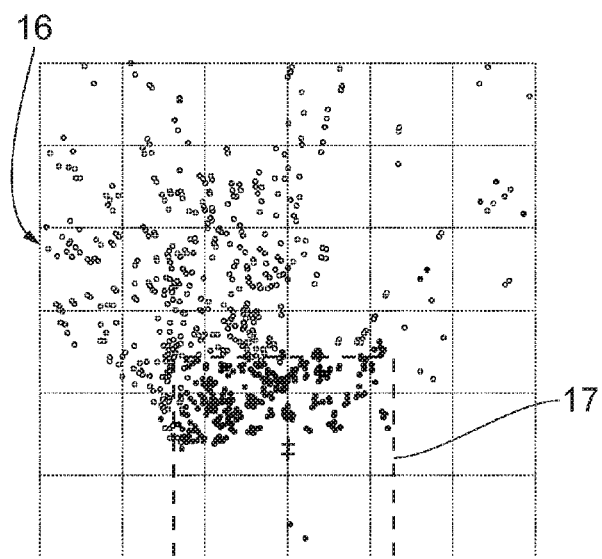
FIG. 7 shows a plan view of candidate points.

FIG. 7 shows a plan view 16 of candidate points, shown in darker markings, from a portion 17 of the image that have been selected for analysis to fit a ground plane to their locations.

Figure 8:
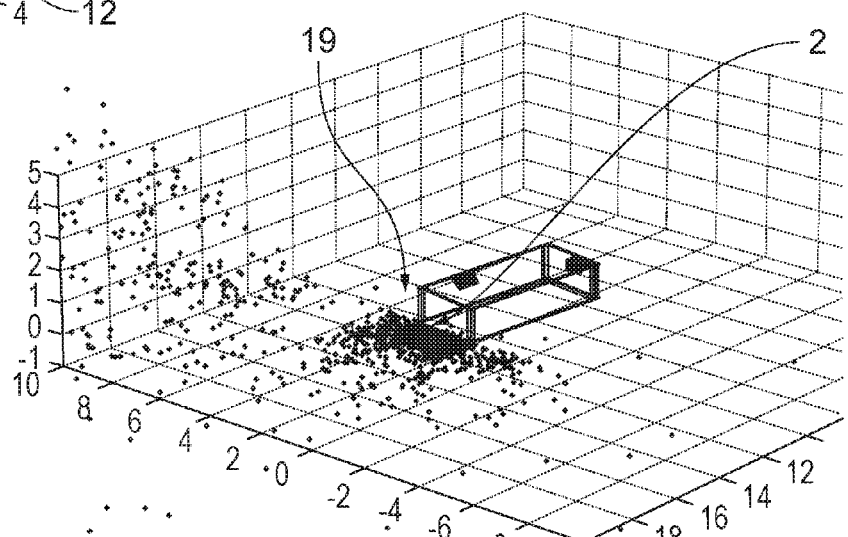
FIG. 8 is a view of candidate points in a three dimensional visual representation, showing an identified ground plane.

FIG. 8 is a view of candidate points identified from images from a camera 2 in a three dimensional visual representation 18, showing an identified ground plane 19.

Figure 3:
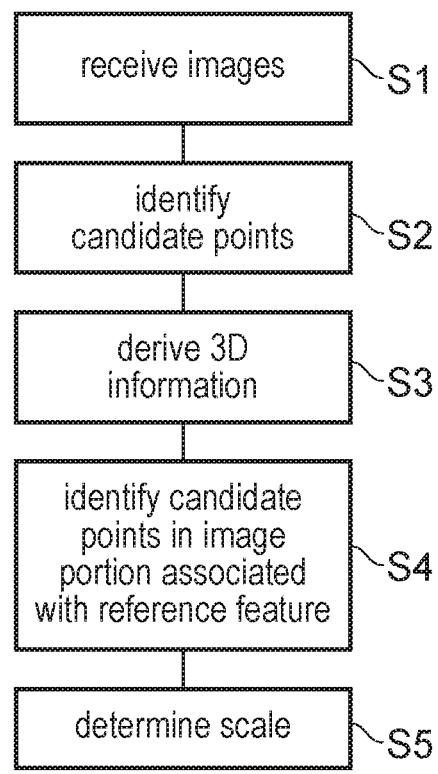
FIG. 3 is a flow chart illustrating a method according to an embodiment of the present disclosure.

At step S5 of FIG. 3, the information extraction stage 7 determines a scale of the three dimensional information based on a distance between the camera and the reference feature. Again, techniques will be known to a skilled person to determine the scale of the three dimensional information once the position of a reference feature such as a ground plane has been identified. This step will be described in more detail in connection with an embodiment of the invention described with reference to FIGS. 9 and 10.

Once the scale of the three dimensional information has been determined, it can be applied to the three dimensional information to create scaled three dimensional information. Two or more sets of scaled three dimensional information may be combined.

In embodiments in which two cameras are fitted to a vehicle, for example a forward facing camera and a rear facing camera, embodiments of the invention may be applied to the sequence of images from the rear facing camera while the vehicle is moving forwards, and may be applied to the sequence of images from the forward facing camera while the vehicle reverses. In this way, the reference feature is being detected for ground that the vehicle has already travelled over, and which is therefore more likely to be flat and to give accurate results.

In embodiments in which two cameras are fitted to a vehicle, for example a forward facing camera and a rear facing camera, the method described above may be carried out on image sequences gathered simultaneously from the two cameras. The position of the reference ground plane determined from the different camera sequences, or the scales derived from the position of the reference ground planes, may be compared. If the scales, or ground positions determined using the scales, correspond with one another, a higher confidence may be placed on the values. In some embodiments, if the ground planes derived from respective different image sequences do not correspond, at least one of the scales is disregarded.

Figure 9:
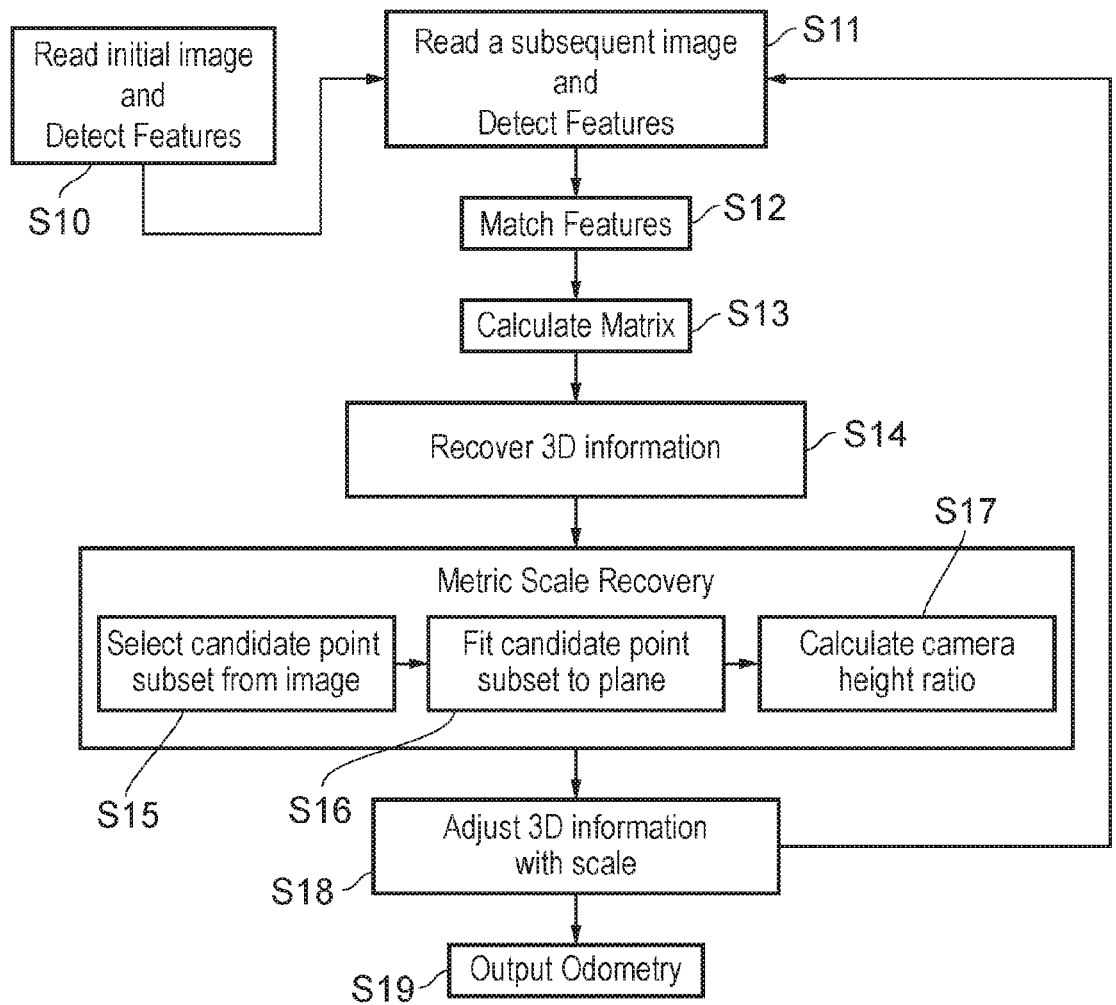
FIG. 9 is a flow chart illustrating a method according to another embodiment of the present disclosure.

In some embodiments, the scale is determined every image frame and previous determinations of the scale are disregarded, as shown in the method of the exemplary embodiment shown in FIG. 9.

Referring to FIG. 9, in operation, at step S10, the image processing stage 6 reads an image and detects features in the image that have the particular characteristics. In some embodiments the image produced by the camera may have undergone correction before being read by the image processing stage 6.

At step S11, the image processing stage 6 reads a subsequent image and detects features in the image that have the particular characteristics. Similarly, in some embodiments the image produced by the camera may have undergone correction before being read by the image processing stage 6.

Then, at step S12, the information extraction stage 7 matches features detected in the initial image with features detected in the subsequent image to identify features common to the initial image and the subsequent image. The locations of any common features in the initial image and subsequent image are stored as candidate points.

At step S13, the information extraction stage 7 generates a candidate point matrix comprising the candidate point location information.

At step S14, the information extraction stage 7 derives information, relating to the three dimensional rotation and translation of the camera between the initial image and the subsequent image, from the candidate point matrix. At this point, no scale information for the three dimensional information is known, and metric scale recovery must be carried out.

At step S15, the information extraction stage 7 selects a subset of the candidate points. More specifically, by identifying which of the candidate points lie within a portion of the image corresponding to part of the field of view of the camera, the information extraction stage selects the candidate points most likely to be associated with a reference feature, which in this embodiment is the ground plane. This can be achieved by first determining the expected position of the reference feature within the field of view of the camera, and then identifying the portion of the image from within which candidate points are selected to include the expected position of the reference feature.

The ground plane region can be found by simple considerations. In one method, the camera height h above the ground is known, so a rectangle on the ground with dimensions 2X×Y, where X is distance to the left and right from the camera and Y is the distance along the direction of motion can be considered. In one example, X might be 1 meter, and Y might be 5 meters. This rectangle can be projected back to the camera image so as to obtain a trapezoidal region in the image. Then it can be assumed that road features (and feature matches between images) inside this region are trapezoidal. Any obstacles in this region should be removed automatically by the RANSAC algorithm as long as they do not cover the full region.

At step s16, the information extraction stage 7 fits the selected candidate points to a plane, using a RANSAC method in this exemplary embodiment.

At step s17, the information extraction stage 7 determines the height of the camera above the plane identified in step s16, which is taken to be the ground plane. The height of the determined ground plane is compared with the known height of the camera above the ground, to generate a camera height ratio. The camera height ratio provides the scale for the three dimensional information.

At step s18, the information extraction stage 7 adjusts three dimensional information, relating to the rotation and translation of the camera between the initial image and the subsequent image recovered in step s14, using the scale obtained in step s17.

Thereafter, in step s19 the odometry can be output as required.

The steps shown in FIG. 9 may be repeated until there are no further images in the sequence or until the vehicle on which the camera is mounted stops.

In other embodiments, three dimensional features are tracked over time and adjustments to the ground plane height, and therefore to the scale factor used to scale the three dimensional information, are made periodically. An example of this method is shown in FIG. 10.

Figure 10:
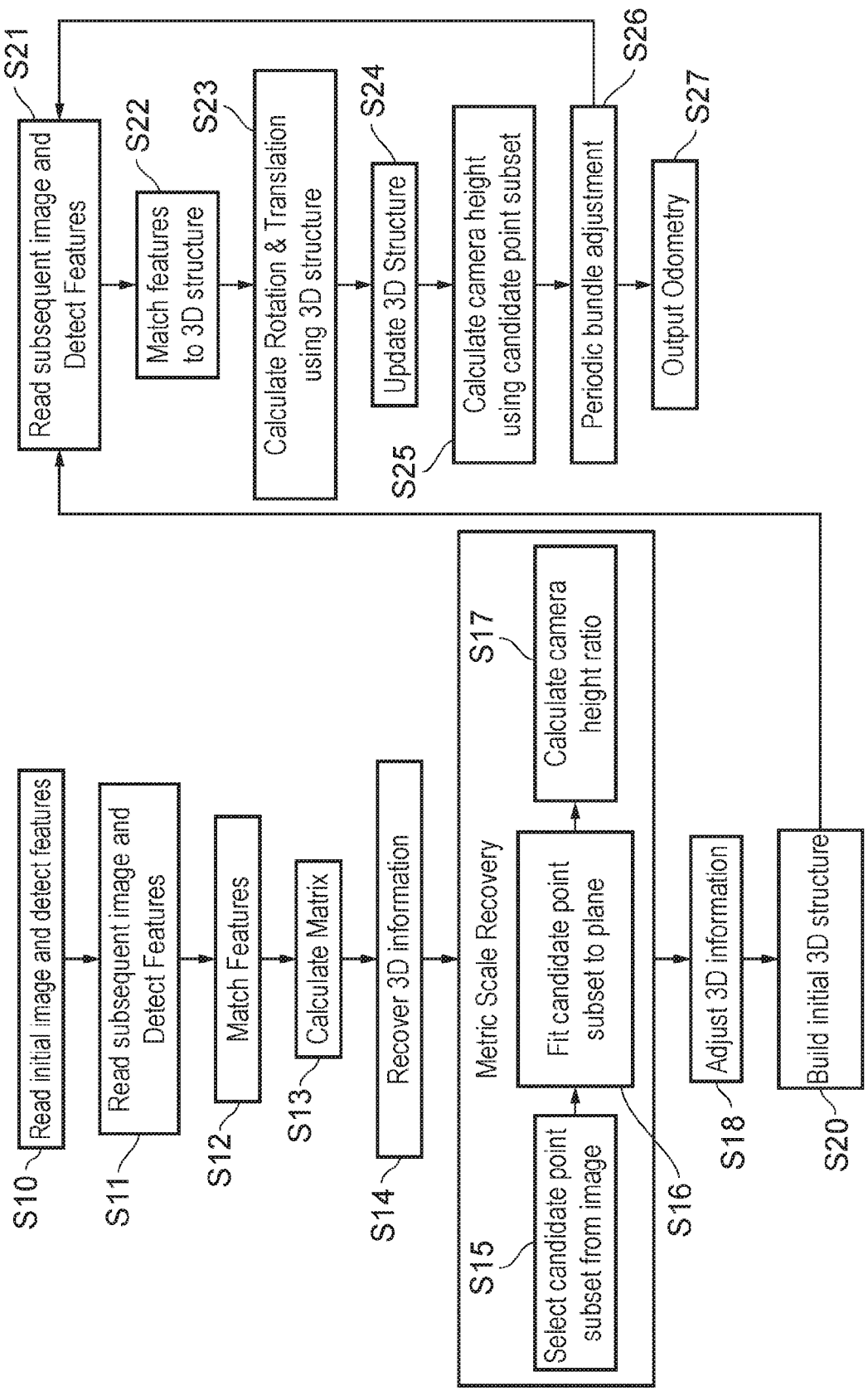
FIG. 10 is a flow chart illustrating a method according to a further embodiment of the present disclosure.

Steps S10-S18 shown in FIG. 10 are the same steps as shown in FIG. 9, and will not be explained further.

In step S20, a three dimensional structure having the correct scale is built from the scaled three dimensional information obtained in step s18.

Thereafter, a subsequent image is processed in a similar manner. In step s21, the image processing stage 6 reads a subsequent image and detects features in the image that have the particular characteristics. Similarly, in some embodiments the image produced by the camera may have undergone correction before being read by the image processing stage 6.

In step s22 the information extraction stage 7 matches features detected in the latest image with features used in the 3D structure. Further details of step s22 will now be explained in more detail with reference to FIGS. 11 and 12.

Figure 11:
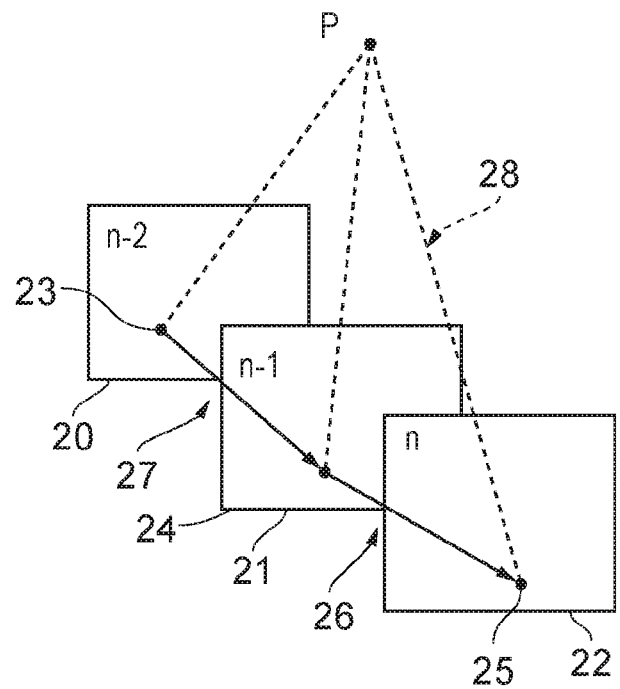
FIG. 11 is a schematic diagram illustrating feature mapping between three consecutive images.

FIG. 11 shows three consecutive images, namely image n-2 20, image n-1 21, and image n 22, captured by a camera. A point P in three dimensional space imaged by the camera is shown as point 23 in image n-2 20; as point 24 in image n-1 21 and as point 25 in image n 22. A match 26 found between point 25 in image n 22 and point 24 in image n-1 21 can be connected using an established match 27 between point 24 in image n-1 21 and point 23 in image n-2 20 to form a new association 28 between point 25 in image n and the three-dimensional point P.

Figure 12:
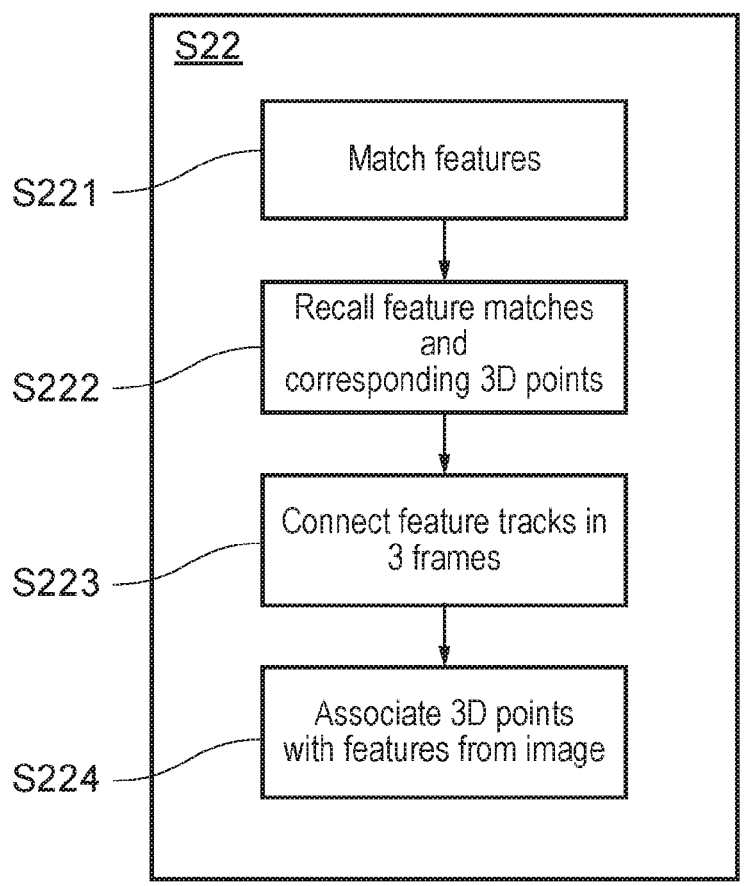
FIG. 12 is a flowchart setting out sub-steps in the method of matching features.

FIG. 12 is a flowchart setting out sub-steps of the method of matching features carried out within step s22 shown in FIG. 10.

In a first sub-step of step 22 of FIG. 10, namely step s222, features from the newest image n 22 are matched with features in the previous image n-1 21. This step may be carried out by a feature matching algorithm.

Then, in a next step s222, previously matched features from image n-1 21 and image n-2 20 and their corresponding 3D-points are recalled.

In sub-step s223, the previously matched features from image n-1 21 and image n-2 20 are associated with features from image n. For example, this may be achieved by exhaustive search of common features from image n-1 21 to form feature tracks, corresponding to identified matches resulting from the same feature P appearing in all three images 20, 21, 22.

In step s224, these tracks, and the associated feature 25 from image n 22, are associated with the known 3D-point P found previously by matching images n-1 21 and image n-2 20.

Thereafter, in step s23 rotation and translation information can be calculated using the three dimensional structure, for example by using a 3 point absolute pose algorithm.

In step s24, the three dimensional structure is updated by adding new features matched in frames n and n-1, which do not have established tracks.

In step s25, the ground plane is identified and the camera height determined once more. In the exemplary method, this is carried out using the method as outlined above with reference to steps s15-s17 of FIG. 9.

In step s26, periodically a bundle adjustment is carried out to reduce or minimize the ground plane error, before operation returns to step 21 to process the next received image. The bundle adjustment uses all previously established feature tracks and 3-dimensional (3D) points in a single optimization algorithm. This step is performed only infrequently, for example every 10-20 frames in some embodiments, owing to the significant computational costs involved.

Thereafter, in step S27 the odometry can be output as required.

The steps s21-s27 shown in FIG. 10 may be repeated until there are no further images in the sequence, or until the vehicle on which the camera is mounted stops.

Other variations and modifications will be apparent to the skilled person. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

The above description of example embodiments is merely exemplary in nature and, thus, variations that do not depart from the gist of the invention are intended to be within the scope of the invention. Such variations are not to be regarded as a departure from the spirit and scope of the invention.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method for determining scale of three dimensional information related to a vehicle comprising:
   receiving a first sequence of images from a first camera and a second sequence of images from a second camera;
   identifying candidate points representing features common to two or more of the images of the first sequence and identifying candidate points representing features common to two or more of the images of the second sequence;
   deriving three dimensional information from the images based on changes in position of candidate points between the images of the first sequence and deriving three dimensional information from the images based on changes in position of candidate points between the images of the second sequence;
   identifying candidate points associated with a reference feature in the images of the first sequence and identifying candidate points associated with a reference feature in the images of the second sequence; and
   determining a first scale of the three dimensional information based on a distance between the first camera and the reference feature, determining a second scale of the three dimensional information based on a distance between the second camera and the reference feature;
   wherein identifying candidate points associated with the reference feature comprises selecting only from candidate points falling within a portion of the image corresponding to a part of the field of view of the first camera and the second camera, respectively; and
   mounting the first camera on the vehicle as a forward facing camera and the second camera as a rear facing camera;
   gathering the first and second image sequences simultaneously from the first and the second camera; and
   wherein the reference feature for the first and the second sequence is a ground plane.

2. The method as claimed in claim 1, further comprising determining an expected position of the reference feature within the field of view of the camera; and
   identifying the portion of the image from within which candidate points are selected to include the expected position of the reference feature.

3. The method as claimed in claim 2, wherein the expected position of the reference feature within the field of view of at least one of the first and second the camera is determined with reference to a position of the camera from which the sequence of images were received.

4. The method as claimed in claim 2, further comprising identifying the portion of the image from within which candidate points are selected to include an expected position of a ground plane in the image.

5. The method as claimed in claim 1, wherein the sequence of images is received from at least one one of the first and second camera mounted on the vehicle, and the reference feature is a surface on which the vehicle stands.

6. The method as claimed in claim 1, wherein the sequence of images is received from at least one one of the first and second camera mounted on the vehicle and the reference feature is a part of the vehicle.

7. The method of claim 1, wherein the sequence of images is received from at least one of the first and second camera mounted on the vehicle arranged to capture images in at least one primary camera direction facing at least one of forward from a front of the vehicle and backwards from a rear of the vehicle.

8. The method of claim 1, further comprising applying the determined scale of the three dimensional information to the three dimensional information to obtain scaled three dimensional information.

9. The method of claim 8, further comprising combining at least two sets of scaled three dimensional information.

10. The method as claimed in claim 8, further comprising:
    building a three dimensional structure from the scaled three dimensional information; and
    updating the three dimensional structure using the scaled three dimensional information from subsequent images.

11. The method as claimed in claim 10, further comprising wherein at least one of the scale of three dimensional information derived from the first sequence of images and the scale of three dimensional information derived from the second sequence of images is disregarded when the scale of three dimensional information derived from the first sequence of images and the scale of three dimensional information derived from the second sequence of images do not correspond.

12. The method as claimed in claim 1, further comprising:
    determining a direction of travel of a vehicle on which the camera is mounted, wherein the camera is arranged to capture images of at least the ground over which the vehicle has passed.

13. A vehicle comprising:
    a first camera is mounted on a vehicle as a forward facing camera
    a second camera is mounted on the vehicle as a rear facing camera
    a processing unit comprising
       an image stage, arranged to receive a first sequence of images from the first camera and a second sequence of images from the second camera;
       an information extraction stage, coupled to the image stage;
       wherein the image stage is operable to identify candidate points representing features common to two or more of the images and to derive three dimensional information from the images based on changes in position of candidate points between the images; and
       wherein the information extraction stage is arranged to identify candidate points associated with a reference feature in the images by selecting only from candidate points falling within a portion of the image corresponding to a part of the field of view of the camera and to determine a scale of the three dimensional information based on a distance between the camera and the reference feature.

14. An image processing unit for a vehicle comprising:
    an image stage, arranged to receive a first sequence of images from a first camera and a second sequence of images from a second camera;
    an information extraction stage, coupled to the image stage;
    wherein the processing unit further comprises instructions for:
       identifying candidate points representing features common to two or more of the images with the image stage;
       deriving three dimensional information from the images based on changes in position of candidate points between the images with the image stage; and
       identifying candidate points associated with a reference feature in the images by selecting only from candidate points falling within a portion of the image corresponding to a part of the field of view of the camera with the information extraction stage; and determining a scale of the three dimensional information based on a distance between the camera and the reference feature with information extraction stage.

15. The apparatus of claim 14, wherein, the processing unit is mounted to the vehicle, and the vehicle further comprises at least one camera mounted to the vehicle such that the sequence of images received by the image stage are captured by the at least one camera and sent to the image stage thereby.

* * * * *